(No Model.)
J. W. KIZZIAR.
SMOKE GENERATOR.
No. 341,335. Patented May 4, 1886.
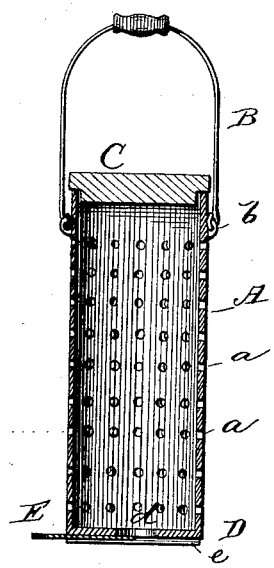
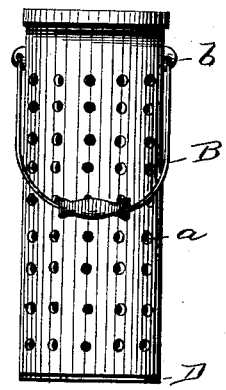
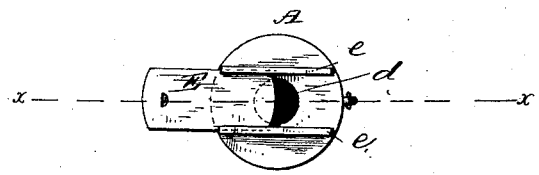
WITNESSES
J. L. Ourand
E. W. Johnson
James W. Kizziar
INVENTOR
Attorney

UNITED STATES PATENT OFFICE.

JAMES WILLIAMS KIZZIAR, OF LIPAN, TEXAS.

SMOKE-GENERATOR.

SPECIFICATION forming part of Letters Patent No. 341,335, dated May 4, 1886.

Application filed July 23, 1885. Serial No. 172,470. (No model.)

*To all whom it may concern:*

Be it known that I, JAMES WILLIAMS KIZZIAR, a citizen of the United States of America, residing at Lipan, in the county of Hood and State of Texas, have invented certain new and useful Improvements in Portable or Suspensible Smoke-Generators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in devices for containing fuel, so that the same can be burned slowly, so as to produce a large amount of smoke, the device being intended for the purpose of protecting orchards, vineyards, &c., from frost; and my invention consists in a perforated cylinder having a removable top and a bottom with an opening which is covered with a sliding door, as shown in the accompanying drawings.

My invention also consists in providing such a device with a bail for transporting the same and suspending it from trees or other objects.

It is well known that farmers and fruit-growers, to protect early crops from frost and certain insects, resort to building brush fires in the open air adjacent thereto, said fires—the smoke and heat combined which emanate therefrom—preventing the frost affecting the crops near the same. My invention is designed to provide an economical means of applying this principle.

In the accompanying drawings, which illustrate my invention, Figure 1 is a side view of my improvement or fuel-burning device constructed in accordance with my invention. Fig. 2 is a sectional view, and Fig. 3 a bottom view.

A represents a metal cylinder, which is preferably made of sheet-iron, and is provided with numerous perforations, $a$. Near the upper end of the cylinder are attached ears $b$, to which is secured a bail, B.

The upper portion of the cylinder A is adapted to receive a cover, C, as shown, and to the opposite end of the cylinder is rigidly attached a bottom, D, having a central opening, $d$, which is adapted to be covered by a sliding door, E, said sliding door being adapted to be retained upon the bottom by means of the downwardly and inwardly projecting flanges $e$. These flanges serve not only as the means for retaining the slide E upon the bottom of the cylinder, but also to hold the latter upright upon the ground, with an air-space between the surface of the ground and bottom of the cylinder. Thus air may readily enter the opening $d$ when the device rests upon the ground.

The operation of my invention is as follows: The fuel which it is desired to burn is tightly packed within the cylinder A, and the cover C is then placed thereon. The fuel is then ignited through the opening $d$ in the bottom of the cylinder, after which the door is closed and the device suspended or placed upon the ground. The fires being "banked" will cause the production of a large amount of smoke, which will pass through the fuel and issue out of the perforations in the sides of the cylinder, and after the fuel is partially consumed, and the cylinder needs replenishing, it will be indicated by the flames, which will issue through the perforations, and said cylinder can readily be replenished by removing the cover.

The device hereinbefore described, besides being used for the protection of orchards, vineyards, &c., from frost, may also be employed for the protection of growing crops from the depredations of insects, and the same may also be employed for burning disinfectants.

I am aware that portable and suspensible fumigators with perforated sides and removable tops are old, and also that a slide in ways in the bottom, as shown in the patent to Dreyer, No. 192,905, July 10, 1877, for fumigators, is also old; but my invention will be readily distinguished, in that the ways $e$ keep the fumigator up from the ground, thus dispensing with legs.

I claim—

In a portable or suspensible smoke-generator, the casing A, having the outlet-perforations $a$ and ears $b$, and the bottom D, having the outlet-opening $d$ and the guides $e$, the latter serving to maintain the bottom out of contact with the removable cover C, bail B, and slide E, substantially as specified.

In testimony whereof I affix my signature in presence of two witnesses.

JAMES WILLIAMS KIZZIAR.

Witnesses:
L. A. MOORE,
I. M. HIGH.